United States Patent
Ishida et al.

(10) Patent No.: US 6,913,163 B2
(45) Date of Patent: Jul. 5, 2005

(54) FUEL CAP

(75) Inventors: Kazuhisa Ishida, Aichi-ken (JP);
Masayuki Nakagawa, Aichi-ken (JP);
Hiroyuki Hagano, Aichi-ken (JP);
Hiroyuki Sato, Aichi-ken (JP); Kimio Tsubaki, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 10/388,456

(22) Filed: Mar. 17, 2003

(65) Prior Publication Data

US 2003/0173362 A1 Sep. 18, 2003

(30) Foreign Application Priority Data

Mar. 18, 2002 (JP) ........................................ 2002-073980

(51) Int. Cl.[7] .............................................. B65D 55/16
(52) U.S. Cl. ............................... 220/375; 220/DIG. 33
(58) Field of Search .............................. 220/375, 86.2, 220/DIG. 33, DIG. 32, 304, 288; 215/306

(56) References Cited

U.S. PATENT DOCUMENTS

| | | | | |
|---|---|---|---|---|
| 4,583,072 A | * | 4/1986 | Matsushita | 340/457 |
| 5,167,340 A | * | 12/1992 | Shaw | 220/295 |
| 5,462,190 A | * | 10/1995 | Lienhart et al. | 220/375 |
| 6,003,709 A | | 12/1999 | Hagano et al. | |
| 6,164,482 A | * | 12/2000 | Araki et al. | 220/375 |
| 6,179,148 B1 | * | 1/2001 | Harris | 220/288 |
| 6,202,879 B1 | * | 3/2001 | Gericke | 220/255 |
| 6,237,798 B1 | * | 5/2001 | Sung | 220/375 |
| 6,332,553 B1 | * | 12/2001 | Yamada et al. | 220/375 |
| 6,543,833 B2 | * | 4/2003 | Hagano et al. | 296/97.22 |
| 6,568,553 B2 | * | 5/2003 | Hagano et al. | 220/304 |
| 6,675,998 B2 | * | 1/2004 | Forsman et al. | 224/148.2 |
| 2003/0024931 A1 | * | 2/2003 | Bae | |
| 2004/0000554 A1 | * | 1/2004 | Griffin et al. | |

FOREIGN PATENT DOCUMENTS

| | | |
|---|---|---|
| JP | A-10-211821 | 8/1998 |
| JP | A-11-301290 | 11/1999 |

* cited by examiner

*Primary Examiner*—Lien M. Ngo
(74) *Attorney, Agent, or Firm*—Posz Law Group, PLC

(57) ABSTRACT

A fuel cap 20 includes a casing 21, a handle 22 mounted on an upper portion of the casing 21 composed of a non-conductive resin material, and grounding mechanism composed of a conductive material. The grounding mechanism includes a contact member 31 that is attached to the handle 22 and is arranged at a position to be in contact with the handle 22 when the handle 22 is held with fingers, and a tether 34 that is linked with the contact member 31 and is used for connection with a fueling lid 12. When the user grasps an operating portion 23a of the handle 22, the user touches arches 31a, 31a of the contact member 31 and the static electricity accumulated in the user is grounded through the tether 34. The fuel cap 20 of this simple structure does not require the high accuracy of dimensions to form the grounding means and attains the sufficient shock resistance.

20 Claims, 7 Drawing Sheets

FUEL CAP

This application claims priority from Japanese patent applications No. 2002-73980, filed on Mar. 18, 2002, the complete disclosure of which is hereby incorporated herein by reference.

BACKGROUND OF THE INVENTION

1. Field of the Invention

The present invention relates to a fuel cap used for a fuel tank of, for example, automobiles or two-wheelers. More specifically the invention pertains to a structure of grounding the static electricity accumulated in a user via a fuel cap at each opening and closing time.

2. Description of the Related Art

A prior art fuel cap is disclosed, for example, in JP 11-301290A. In the prior art fuel cap, a handle is composed of a conductive material, and a part of the handle is in contact with a filler neck. When the user grasps the handle for opening and closing the fuel cap, this structure enables the static electricity accumulated in the user to be grounded through the handle, the filler neck, and an attachment bracket to the vehicle body.

In the prior art fuel cap, the handle composed of the conductive material is required to have a relatively large wall thickness, in order to attain the sufficient shock resistance. The expensive conductive material undesirably increases the total manufacturing cost.

In the structure of the prior art fuel cap, the part of the handle is in contact with the filter neck. This structure requires the high accuracy of dimensions of the handle and the filter neck and thus leads to the relatively time- and labor-consuming manufacturing and assembling work.

SUMMARY OF THE INVENTION

The object of the present invention is thus to provide a fuel cap of simple structure that does not require the high accuracy of dimensions to form a grounding line and attains the sufficient shock resistance.

In order to attain at least part of the above and the other related objects, the present invention is directed to a fuel cap that is used for opening and closing an inlet opening. The fuel cap includes: a closer that closes the inlet opening; a handle that is mounted on said closer and is composed of a non-conductive resin material; and a grounding mechanism that is composed of a conductive material. The grounding mechanism has: a contact member that is attached to said handle and is arranged at a position to be in contact with said handle, when said handle is held with fingers; and a tether that is linked with said contact member and is used for connection with a vehicle body member.

In the structure of the present invention, the user grasps the handle of the fuel cap and rotates the fuel cap in a closing direction or in an opening direction. This opening or closing operation of the handle moves the closer to open or close the inlet opening. When the user grasps the handle, part of the user, typically fingers, touches the contact member of the grounding mechanism. The contact member is connected with the vehicle body member via the tether. This structure enables the static electricity accumulated in the user to be grounded through the contact member and the tether to the vehicle body member.

In the fuel cap of the present invention, the grounding mechanism including the contact member and the tether is composed of the conductive material, while the handle is composed of the non-conductive resin material. This arrangement desirably reduces the consumed quantity of the expensive conductive material. The handle composed of the non-conductive resin material requires a less wall thickness to attain the sufficient shock resistance. Combination of the less wall thickness of the handle with the reduced quantity of the conductive material favorably reduces the total manufacturing cost.

The contact member is connected with the vehicle body member via the tether. This arrangement does not require the high accuracy of dimensions and facilitates the manufacturing and assembling work. Since the tether is connected with the vehicle body member, the fuel cap released from the inlet opening is not lost nor damaged by a fall.

The grounding mechanism is not restrictive but may be composed of any suitable material and have any appropriate shape, as long as the grounding mechanism forms a grounding line from the contact member to the vehicle body member. For example, all of the contact member and the tether may be composed of a conductive resin material or a metal material. Alternatively the contact member or the tether may be a resin member with a metal material inserted therein. The above and other objects, features, aspects, and advantages of the present invention will become more apparent from the following detailed description of the preferred embodiments with the accompanying drawings.

DESCRIPTION OF THE PREFERRED EMBODIMENTS

(1) Structure of Fuel Cap 20

Figure 1:
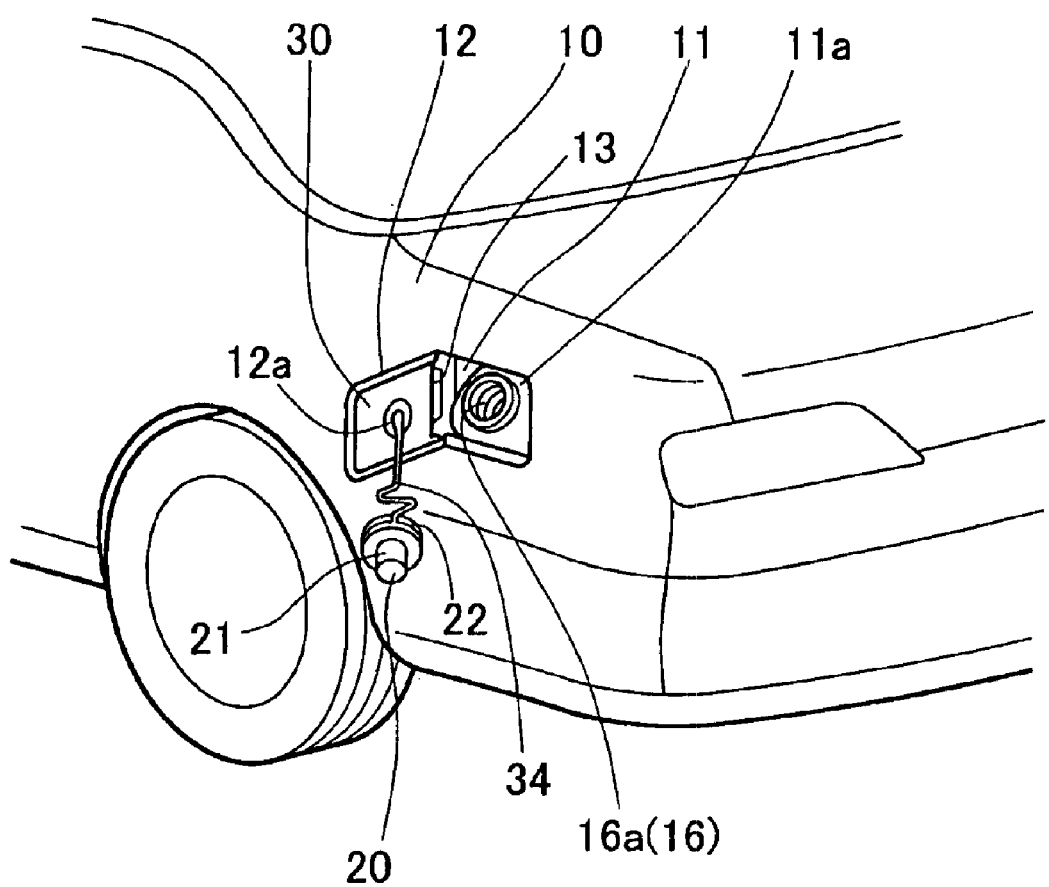
FIG. 1 is a perspective view illustrating a rear portion of an automobile with a cap assembly in a first embodiment of the present invention.
Figure 2:
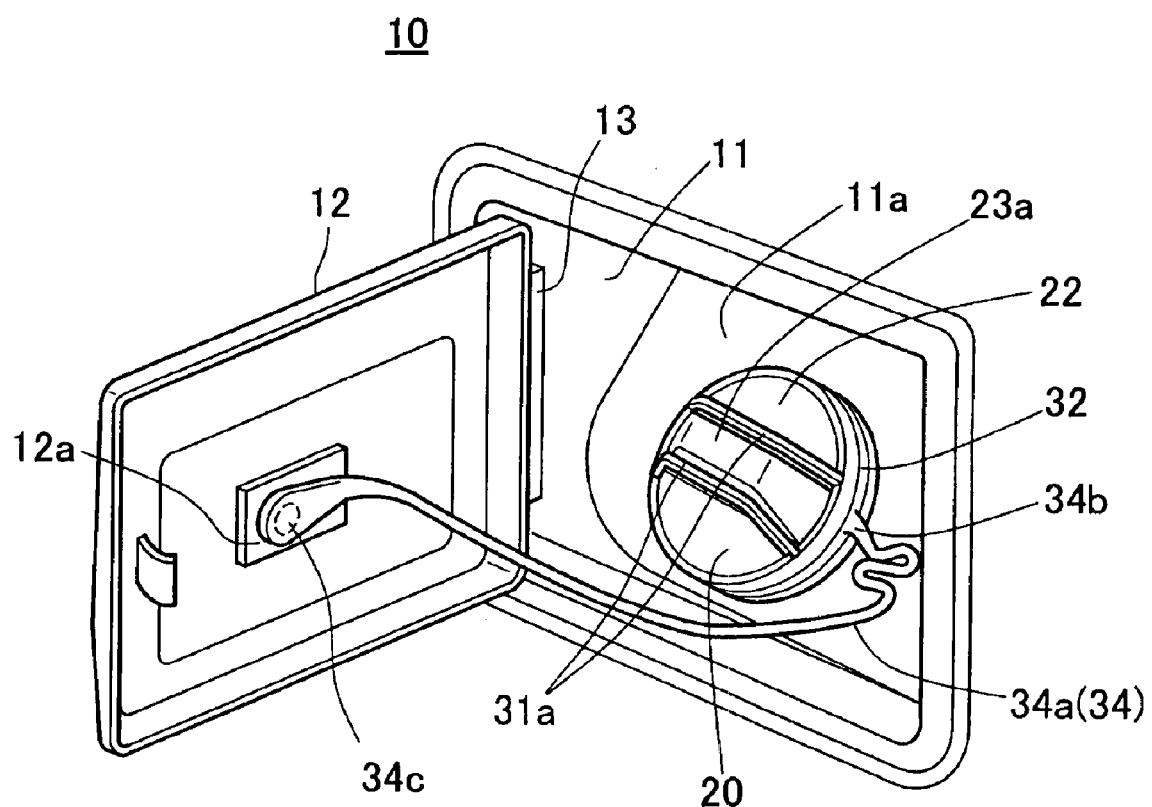
FIG. 2 is a perspective view illustrating the cap assembly in the opening state of a fueling lid.

FIG. 1 is a perspective view illustrating a rear portion of an automobile with a cap assembly in a first embodiment of the present invention. FIG. 2 is a perspective view illustrating the cap assembly in the opening state of a fueling lid 12. A recess 11 for fuel supply is formed on the rear portion of a vehicle body panel 10 shown in FIG. 1. The fueling lid 12 covers the opening of the recess 11. The fueling lid 12 is attached to the vehicle body panel 10 via a hinge 13 in an openable and closable manner. An inlet opening 16a of an inlet filler pipe 16, which is connected to a fuel tank (not shown), is formed on a bottom wall 11a of the recess 11. A fuel cap 20 is fit in the inlet opening 16a in an openable and closable manner.

Figure 3:
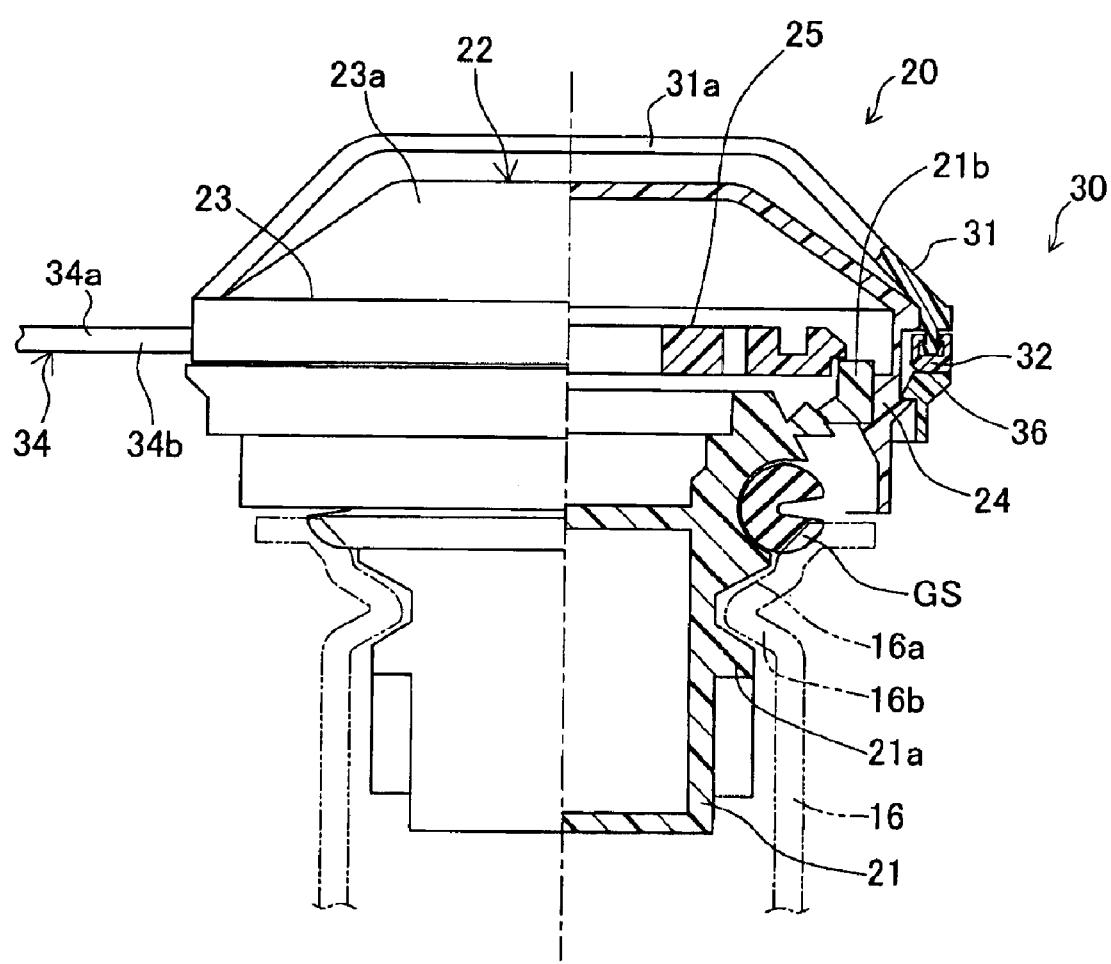
FIG. 3 is a half sectional view illustrating a fuel cap attached to an inlet filler pipe.
Figure 3A:
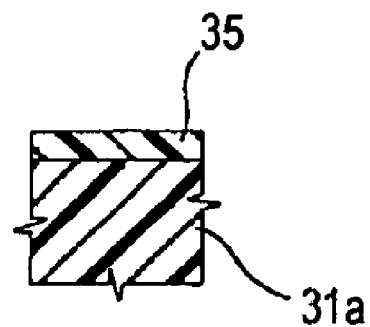
FIG. 3A is a partial cross sectional view showing a coating of electrically conductive material formed on the contact member.
Figure 3B:
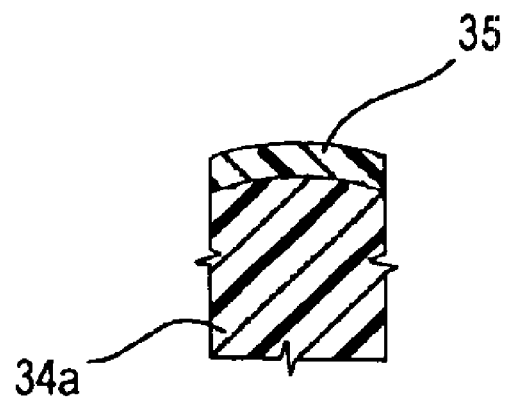
FIG. 3B is a partial cross sectional view showing a coating of electrically conductive material formed on the tether.

FIG. 3 is a half sectional view illustrating the fuel cap 20 attached to the inlet filler pipe 16. The fuel cap 20 has a casing 21 that is attached to the inlet filler pipe 16, a handle 22 that is mounted on an upper flange 21b on the casing 21, and a gasket GS that is set on the upper portion of the casing 21. The fuel cap 20 is a quick turn-type cap, which is rotated by a predetermined angle, for example, about 90 degrees, to close the inlet opening 16a of the inlet filler pipe 16. An engagement portion 21a is formed on the outer circumference of the casing 21. The engagement portion 21a engages with an engagement protrusion 16b of the inlet filler pipe 16, so that the gasket GS is pressed against the inner wall of the inlet filler pipe 16 for sealing.

The handle 22 is formed in a cup shape including a top wall 23 that is provided with an operating portion 23a rotatable with fingers, and a side wall 24 that is extended in a tubular shape from the outer circumference of the top wall 23. The handle 22 is composed of a non-conductive resin material, such as nylon or polyacetal. A torque mechanism 25 is interposed between the handle 22 and the casing 21. The torque mechanism 25 closes the inlet opening 16a with a force that does not exceed a preset rotational torque, so as to effectively prevent the fuel cap 20 from being rotated excessively in a closing direction.

Figure 4:
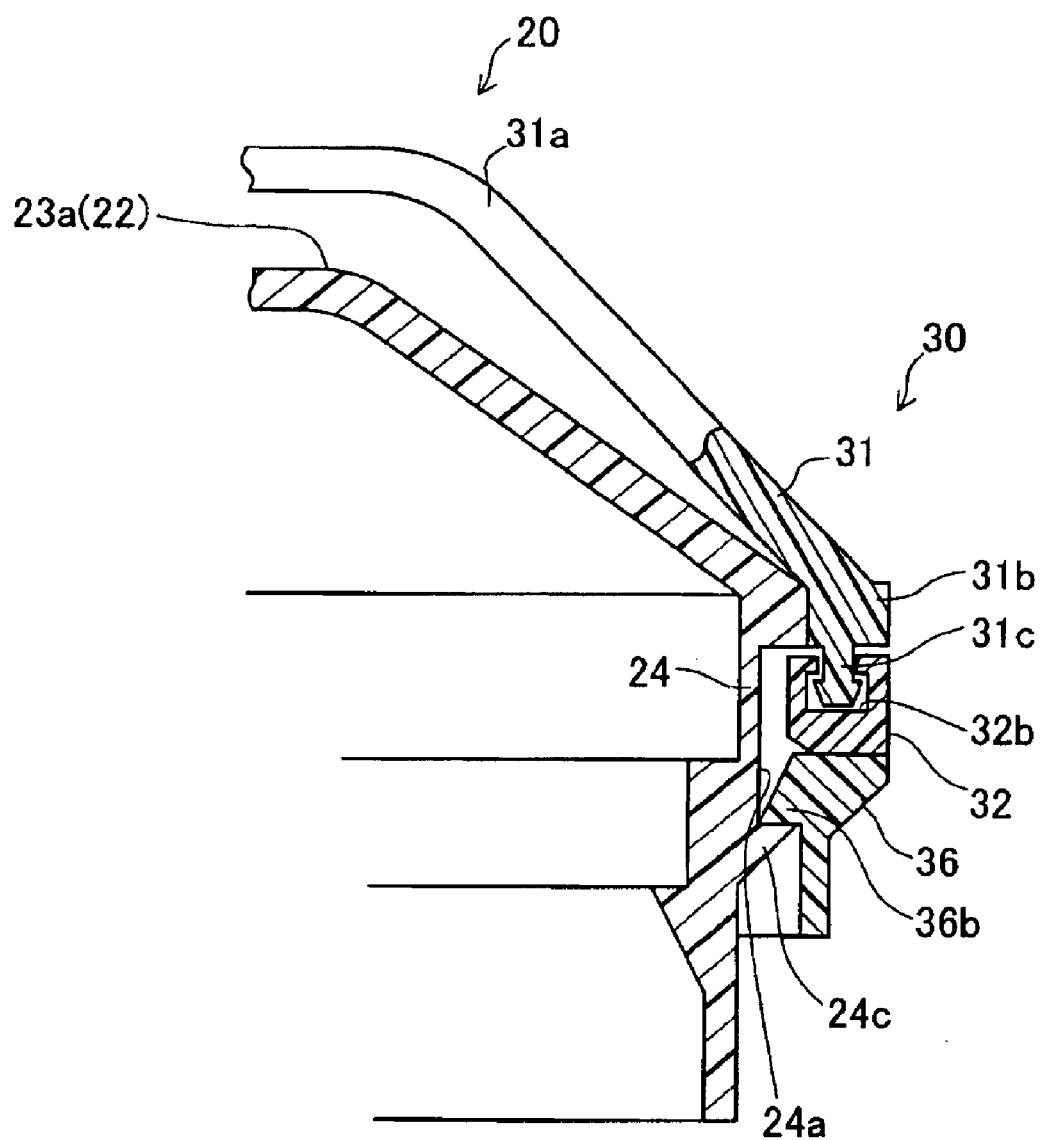
FIG. 4 is a sectional view illustrating the main part of a handle.
Figure 5:
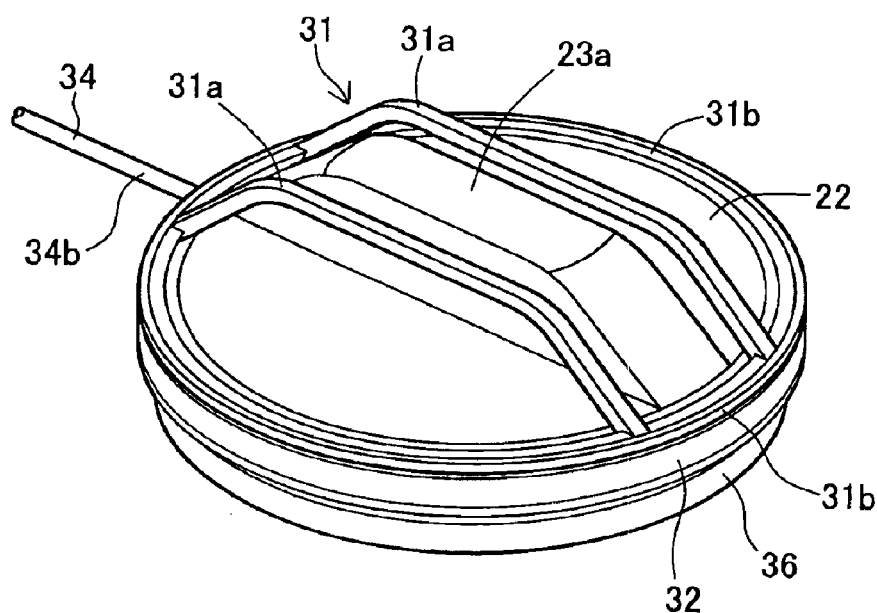
FIG. 5 is a perspective view illustrating the handle.

A tether mechanism 30, which also functions as grounding means, is attached to the handle 22 of the fuel cap 20. FIG. 4 is a sectional view illustrating the main part of the handle 22. FIG. 5 is a perspective view illustrating the handle 22.

The tether mechanism 30 includes a contact member 31, a rotation ring 32 that supports the lower end of the contact member 31, a tether 34, and an engagement ring 36. The contact member 31, the rotation ring 32, and the tether 34 are integrally formed by injection molding of a flexible and conductive resin material, a conductive rubber, or a conductive thermoplastic elastomer (for example, TPEE). The available conductive resin material is obtained by mixing an electrically conductive material, such as carbon, conductive fillers, or conductive whiskers, with a resin like polypropylene or polyethylene to a mixture having a volume resistivity of not higher than $10^{11}\Omega \cdot cm$. Another method first molds the contact member 31, the rotation ring 32, and the tether 34 of a rubber, a thermoplastic elastomer, or a resin without the conductive material and them applies or prints a conductive coating material 35 having a volume resistivity of not higher than $10^{11}\Omega \cdot cm$ on the surface of the mold.

As shown in FIGS. 4 and 5, the contact member 31 has arches 31a,31a, a support ring 31b, and an engagement projection 31c. The arches 31a,31a are formed along both sides of the operating portion 23a and are composed of a flexible material to be in close contact with the operating portion 23a, when the operating portion 23a is held with fingers. The lower ends of the arches 31a,31a are linked with each other and supported by the support ring 31b. The support ring 31b is formed along the whole outer circumference of the handle 22. As shown in FIG. 4, the engagement projection 31c is protruded from the bottom face of the support ring 31b to be coupled with the rotation ring 32 in a rotatable manner.

The rotation ring 32 is a ring-shaped member received in a circular groove 24a, which is formed on the side wall 24 of the handle 22, in a freely rotatable manner and has a guide groove 32b on its upper portion. The guide groove 32b has a narrowed opening. The engagement projection 31c of the contact member 31 is pressed into the guide groove 32b, so that the rotation ring 32 supports the support ring 31b of the contact member 31 in a freely rotatable manner. The engagement ring 36 fixes the rotation ring 32 and prevents the rotation ring 32 from being slipped off the side wall 24. An engagement catch 36b is protruded from the inner wall of the engagement ring 36 and engages with an engagement projection 24c, which is protruded from the side wall 24 of the handle 22. The rotation ring 32 is accordingly held on the top face of the engagement ring 36 and is received in the circular groove 24a in a freely rotatable manner.

The tether 34 (see FIGS. 2 and 3) is coupled with the rotation ring 32. The tether 34 has a flexible, long tether main body 34a and is linked with the rotation ring 32 on its fixed end 34b. As shown in FIG. 2, the other end of the tether 34 forms a detent 34c. The detent 34c is attached to a fixation 12a, which is formed on the rear face of the fueling lid 12, in a pivotally rotatable manner. While the fueling lid 12 is open, the fuel cap 20 released from the inlet filler pipe 16 is suspended via the tether 34 fixed to the fueling lid 12 as shown in FIG. 1. The fuel cap 20 is hung at a position sufficiently apart from the vehicle body panel 10 and accordingly does not interfere with smooth insertion of a fuel supply gun for fuel supply.

(2) Opening and Closing Operation of Fuel Cap 20

The following describes the opening and closing operation of the fuel cap 20. In the released state of the fuel cap 20 shown in FIG. 1, the user tries to grasp the operating portion 23a and touches the arches 31a,31a arranged outside the operating portion 23a as shown in FIG. 5. The arches 31a,31a are then elastically deformed to be in close contact with the operating portion 23a. The user holds the operating portion 23a together with the arches 31a,31a, inserts the lower portion of the casing 21 into the inlet opening 16a of the inlet filler pipe 16 as shown in FIG. 3, and rotates the fuel cap 20 by the predetermined angle (about 90 degrees) to close the inlet opening 16a. The rotation ring 32 is freely rotatable relative to the handle 22. The tether 34 is extended with substantially no slacks and does not receive any large load from the fueling lid 12 or the fuel cap 20. This arrangement ensures the smooth closing operation of the fuel cap 20.

The fuel cap 20 is opened in the following manner. As shown in FIG. 2, when the user opens the fueling lid 12, the tether 34 moves in its longitudinal direction with the opening action of the fueling lid 12 and rotates the rotation ring 32 relative to the handle 22. When the user tries to grasp the operating portion 23a, the arches 31a,31a are elastically deformed in the same manner as in the case of the closing operation discussed above. The user thus holds the operating portion 23a together with the arches 31a,31a. Since the arches 31a,31a are connected with the fueling lid 12 via the tether 34, the fueling lid 12 is attached to the vehicle body panel 10, there is the ground line from the arches 31a,31a to the vehicle body panel 10. When the user touches the arches 31a,31a, the user is connected with the ground line and the static electricity accumulated in the user is discharged through this ground line. A counterclockwise rotation of the operating portion 23a releases the fuel cap 20 from the inlet filler pipe 16 and opens the inlet opening 16a.

(3) Functions and Effects of Fuel Cap 20

Since the grounding means including the contact member 31 and the tether 34 is composed of a conductive material, while the handle 22 is composed of a non-conductive material, this arrangement desirably reduces the consumed quantity of the conductive material. The handle 22 composed of the non-conductive material requires a less wall thickness to attain the sufficient shock resistance. Combination of the less wall thickness of the handle 22 with the reduced quantity of the conductive material favorably reduces the total manufacturing cost.

The contact member 31 is connected with the fueling lid 12 and the vehicle body panel 10 via the tether 34. Compared with the prior art technique, this arrangement does not require the high accuracy of dimensions and facilitates the manufacturing and assembling work.

Since the fuel cap 20 released from the inlet opening 16a is hung with the tether 34, which forms the ground line, the fuel cap 20 is not lost.

Since the arches 31a,31a of the contact member 31 are arranged apart from the operating portion 23a by predetermined intervals, when the user grasps the operating portion 23a, the arches 31a,31a flexibly deforms to be in close contact with the operating portion 23a. This arrangement ensures the touch of the arches 31a,31a with fingers and thereby forms the effective ground line.

(4) Another Embodiment

Figure 6:
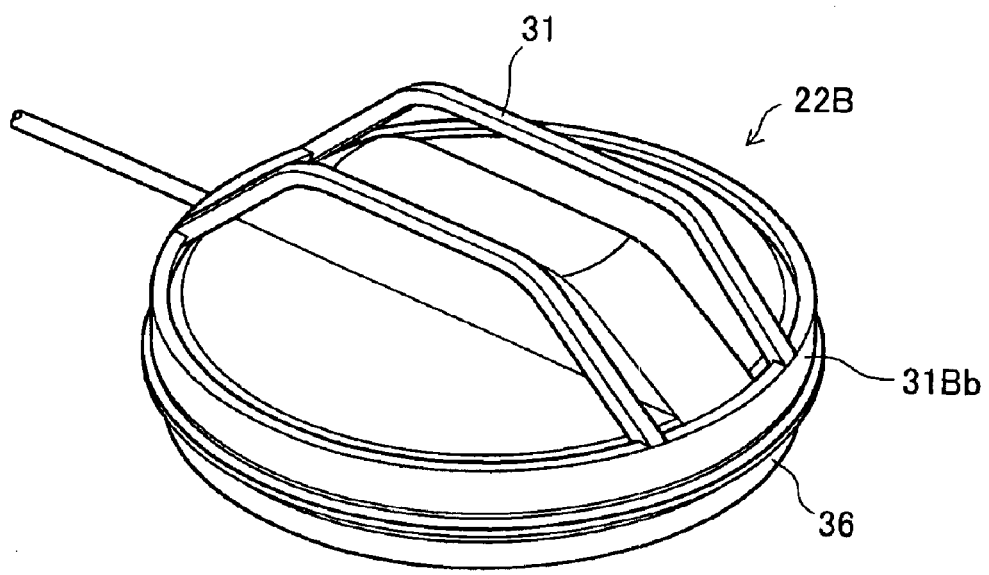
FIG. 6 is a perspective view illustrating a handle of another fuel cap in a second embodiment of the invention.
Figure 7:
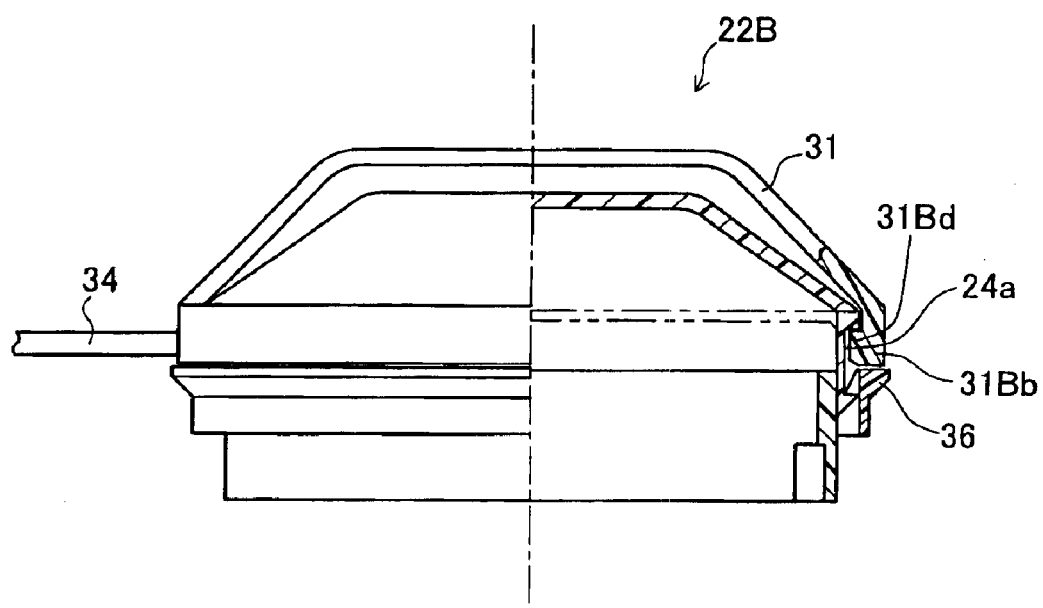
FIG. 7 is a half sectional view illustrating the handle of the second embodiment.

FIG. 6 is a perspective view illustrating a handle 22B of another fuel cap in a second embodiment of the invention. FIG. 7 is a half sectional view illustrating the handle 22B of the second embodiment. The second embodiment is characterized by integrated attachment of the contact member 31 to the handle 22B. The structure of the second embodiment omits the rotation ring 32, which is used in the structure of the first embodiment. In the structure of the second embodiment, the contact member 31 has a ring 31Bb that is extended downward, and an engagement projection 31Bd that is protruded from the inner circumference of the ring 31Bb. The engagement projection 31Bd engages with the circular groove 24a of the handle 22B and is fixed by the engagement ring 36. The fuel cap of the second embodiment is openable and closable with a small rotation angle of the handle 22B. The small rotation of the handle 22B effectively prevents a significant twist of the tether 34 and desirably simplifies the structure.

The embodiments are to be considered in all aspects as illustrative and not restrictive. There may be many modifications, changes, and alterations without departing from the scope or spirit of the main to characteristics of the present invention. All changes within the meaning and range of equivalency of the claims are therefore intended to be embraced therein.

In the structures of the above embodiments, one end of the tether 34 is fixed to the fueling lid 12. This is, however, not restrictive. The tether may be fixed to any member, as long as such fixation does not interfere with the smooth opening and closing operation of the fuel cap 20 or the formation of the ground line. The tether 34 may be fixed to a vehicle body member in a neighborhood of the inlet opening 16a, for example, the bottom wall 11a of the recess 11.

The scope and spirit of the present invention are indicated by the appended claims, rather than by the foregoing description.

What is claimed is:

1. A fuel cap that is used for opening and closing an inlet opening, the fuel cap comprising:
   a closer that closes the inlet opening;
   a handle mounted on the closer and is composed of a non-electrically conductive resin material; and
   a grounding mechanism that includes:
      a contact member that is attached to the handle and is arranged at a position to be in contact with the handle when the handle is held with fingers; and
      a tether that is linked with the contact member and is used for connection with a vehicle body member, wherein the material of the contact member and the material of the tether include electrically conductive material.

2. A fuel cap in accordance with claim 1, wherein the tether includes a long tether main body having a first end and a second end, the first end being linked with the contact member, the second end being configured to be connected with the vehicle body member.

3. A fuel cap in accordance with claim 2, wherein the inlet opening is located in a recess formed in a vehicle body panel, and the vehicle body member is an openable fueling lid adapted to an opening shape of the recess.

4. A fuel cap in accordance with claim 1, wherein the handle includes a circular cup-shaped handle main body that is mounted on an upper portion of the closer in a rotatable manner, and an operating portion that is protruded from a top wall of the handle main body, and the contact member is arranged close to the operating portion and is constructed to be pressed by the operating portion, when the operating portion is held with fingers.

5. A fuel cap in accordance with claim 4, wherein the contact member includes a support ring rotatably mounted on an outer circumference of the handle main body, and an arch formed integrally with the support ring and arranged close to the operating portion.

6. A fuel cap in accordance with claim 5, wherein the arch is made of a flexible material.

7. A fuel cap in accordance with claim 6, wherein the arch is arranged on a side of the operating portion with a predetermined space.

8. A fuel cap in accordance with claim 7, wherein the handle includes a rotation ring, the rotational ring being mounted rotatably on the outer circumference of the handle main body and supporting rotatably the support ring.

9. A fuel cap in accordance with claim 8, wherein the support ring and the rotation ring are formed integrally.

10. A fuel cap in accordance with claim 1, wherein the electrically conductive material is selected among the group consisting of flexible and electrically conductive resin materials, electrically conductive rubbers, and electrically conductive thermoplastic elastomers, and the contact member and the tether are made of the selected material.

11. A fuel cap in accordance with claim 1, wherein the contact member and the tether are made from non-electrically conductive material, and the electrically conductive material exists on the surfaces of the contact member and the tether.

12. A fuel cap in accordance with claim 1, wherein the grounding mechanism is composed entirely of electrically conductive material.

13. A fuel cap for opening and closing a fuel inlet of a vehicle, wherein the fuel cap comprises:
   a closer that closes the inlet;
   a handle that is fixed to the closer and is composed of a non-electrically conductive resin material;
   a contact member that is attached to the handle and is constructed and arranged to contact the handle when the handle is held by finger of a user, wherein the material of the contact member includes an electrically conductive material; and
   a tether that connects a vehicle body member to the contact member, wherein the material of the tether include electrically conductive material, and the tether electrically connects the contact member to the vehicle body member for grounding the contact member.

14. A fuel cap in accordance with claim 13, wherein the electrically conductive material is selected among the group consisting of flexible and electrically conductive resin materials, electrically conductive rubbers, and electrically conductive thermoplastic elastomers, and the contact member and the tether are made of the selected material.

15. A fuel cap in accordance with claim 13, wherein the electrically conductive material exists on the surfaces of the contact member and the tether, and, beneath the electrically conductive material on the contact member, the contact member is made of non-electrically conductive material, and beneath the electrically conductive material on the tether, the tether is made of non-electrically conductive material.

16. A fuel cap in accordance with claim 13, wherein the contact member and the tether are composed entirely of electrically conductive material.

17. A fuel cap in accordance with claim 11, wherein the electrically conductive material is applied to mold surfaces for forming the contact member and the tether.

18. A fuel cap in accordance with claim 11, wherein the electrically conductive material is printed on mold surfaces for forming the contact member and the tether.

19. A fuel cap in accordance with claim 15, wherein the electrically conductive material is applied to mold surfaces for forming the contact member and the tether.

20. A fuel cap in accordance with claim 15, wherein the electrically conductive material is printed on mold surfaces for forming the contact member and the tether.

* * * * *